US 12,253,285 B2

(12) United States Patent
Ding et al.

(10) Patent No.: US 12,253,285 B2
(45) Date of Patent: Mar. 18, 2025

(54) GEOTHERMAL ENERGY STORAGE AND CONVERSION SYSTEMS AND METHODS

(71) Applicant: POWER8 TECH INC., Los Gatos, CA (US)

(72) Inventors: Lien Chun Ding, Taoyuan (TW); Chih Cheng Tai, Campbell, CA (US)

(73) Assignee: Power8 Tech. Inc., Los Gatos, CA (US)

(*) Notice: Subject to any disclaimer, the term of this patent is extended or adjusted under 35 U.S.C. 154(b) by 0 days.

(21) Appl. No.: 18/199,757

(22) Filed: May 19, 2023

(65) Prior Publication Data

US 2023/0288100 A1    Sep. 14, 2023

Related U.S. Application Data

(63) Continuation-in-part of application No. 17/777,516, filed as application No. PCT/US2022/029374 on May 16, 2022, now Pat. No. 11,870,253.
(Continued)

(30) Foreign Application Priority Data

Dec. 3, 2021 (CN) .......................... 202111466565.5

(51) Int. Cl.
  *F24T 10/10*   (2018.01)
  *F24T 50/00*   (2018.01)
  *F24T 10/00*   (2018.01)

(52) U.S. Cl.
  CPC .............. *F24T 10/10* (2018.05); *F24T 50/00* (2018.05); *F24T 2010/56* (2018.05)

(58) Field of Classification Search
  CPC ......... Y02E 10/10; Y02E 10/20; Y02E 70/30; H02J 15/003
  See application file for complete search history.

(56) References Cited

U.S. PATENT DOCUMENTS 2,652,690 A * 9/1953 Labriola ................. F03B 13/06
                                                                 60/398
3,991,574 A   11/1976 Frazier
(Continued)

FOREIGN PATENT DOCUMENTS

CN   102966387 A   3/2013
CN   103925111 A   7/2014
(Continued)

OTHER PUBLICATIONS

International Search Report mailed Apr. 1, 2024 in International Application No. PCT/US 23/81234, 15 pages.
(Continued)

*Primary Examiner* — Thomas E Lazo
(74) *Attorney, Agent, or Firm* — Haverstock & Owens, A Law Corporation (57) ABSTRACT

A geothermal energy storage/converting system utilizes hot water and pressure, such as steam, generated by the geothermal heat/ground water to store energy and/or generate electricity. The system utilizes a motion of a piston, driven by steam generated by geothermal heat, to control movement of an amount of water, which is used to store the energy by compressing gas as energy storage. When electricity is needed, the compressed gas provides a force to push the stored water to drive a hydrogenerator to generate electricity. In a geothermal energy converting embodiment, system utilizes a motion of a piston, driven by steam generated by geothermal heat, to control movement of an amount of water to drive a hydrogenerator to generate electricity.

4 Claims, 6 Drawing Sheets

Related U.S. Application Data (60) Provisional application No. 63/345,269, filed on May 24, 2022.

(56) References Cited

U.S. PATENT DOCUMENTS

| | | | |
|---|---|---|---|
| 4,206,608 A * | 6/1980 | Bell | F03D 9/17 |
| | | | 290/55 |
| 4,220,006 A | 9/1980 | Kindt | |
| 4,367,786 A | 1/1983 | Hafner et al. | |
| 4,525,631 A | 6/1985 | Allison | |
| 6,109,358 A | 8/2000 | McPhee | |
| 6,718,761 B2 * | 4/2004 | Merswolke | F03D 9/008 |
| | | | 60/398 |
| 7,168,252 B1 | 1/2007 | Price | |
| 7,281,371 B1 * | 10/2007 | Heidenreich | F03B 13/06 |
| | | | 60/398 |
| 7,364,810 B2 | 4/2008 | Sridhar et al. | |
| 7,579,700 B1 * | 8/2009 | Meller | F03B 17/005 |
| | | | 290/43 |
| 7,663,255 B2 * | 2/2010 | Kim | F02C 6/18 |
| | | | 290/1 R |
| 7,743,609 B1 | 6/2010 | Brostmeyer | |
| 7,878,280 B2 | 2/2011 | Sridhar et al. | |
| 8,037,678 B2 | 10/2011 | McBride et al. | |
| 8,127,542 B1 * | 3/2012 | Dolcimascolo | F03B 17/005 |
| | | | 60/398 |
| 8,240,956 B2 | 8/2012 | Lewis | |
| 8,723,347 B2 | 5/2014 | Crane et al. | |
| 8,739,533 B2 | 6/2014 | Yogev et al. | |
| 8,806,866 B2 | 8/2014 | McBride et al. | |
| 8,823,195 B2 * | 9/2014 | Legacy | F03B 13/08 |
| | | | 290/43 |
| 9,059,605 B2 | 6/2015 | Murray et al. | |
| 9,261,068 B2 * | 2/2016 | Barakat | F03B 13/00 |
| 9,410,559 B2 | 8/2016 | VanWalleghem et al. | |
| 9,422,948 B2 * | 8/2016 | Kim | F15B 15/00 |
| 9,444,378 B2 * | 9/2016 | Fong | F17C 13/04 |
| 9,562,521 B2 | 2/2017 | Yogev | |
| 9,797,366 B2 | 10/2017 | Schmidt-Boecking et al. | |
| 10,203,735 B2 | 2/2019 | Gross et al. | |
| 10,205,323 B2 * | 2/2019 | Lowell | H02J 3/381 |
| 10,208,737 B1 * | 2/2019 | Freeman | F04B 9/105 |
| 10,344,741 B2 * | 7/2019 | Sant | F03D 13/25 |
| 10,415,469 B2 * | 9/2019 | Blount | F02C 6/06 |
| 10,655,505 B2 | 5/2020 | Matsukuma et al. | |
| 10,707,802 B1 * | 7/2020 | Materna | H02S 20/32 |
| 10,823,132 B2 | 11/2020 | Mesinger et al. | |
| 10,836,579 B2 | 11/2020 | Yogev | |
| 10,837,429 B2 | 11/2020 | Pedretti et al. | |
| 10,859,207 B2 | 12/2020 | Lewis et al. | |
| 11,274,792 B2 | 3/2022 | Stradiotto et al. | |
| 11,387,707 B2 | 7/2022 | Yogev | |
| 11,404,935 B2 | 8/2022 | Yogev | |
| 2002/0144503 A1 | 10/2002 | Merswolke et al. | |
| 2005/0155347 A1 | 7/2005 | Lewellin | |
| 2005/0198959 A1 | 9/2005 | Schubert | |
| 2005/0279085 A1 * | 12/2005 | Moore | F03B 13/185 |
| | | | 60/398 |
| 2007/0289622 A1 | 12/2007 | Hecht | |
| 2008/0136186 A1 | 6/2008 | Gogoana et al. | |
| 2008/0211230 A1 | 9/2008 | Gurin | |
| 2009/0152871 A1 * | 6/2009 | Ching | F03G 7/00 |
| | | | 415/916 |
| 2010/0089063 A1 * | 4/2010 | McBride | F15B 21/14 |
| | | | 60/682 |
| 2010/0096858 A1 | 4/2010 | Riley | |
| 2010/0192568 A1 | 8/2010 | Peacock | |
| 2010/0205960 A1 * | 8/2010 | McBride | F03G 4/001 |
| | | | 60/595 |
| 2010/0252028 A1 | 10/2010 | Mierisch et al. | |
| 2010/0270801 A1 | 10/2010 | Liu | |
| 2010/0326062 A1 | 12/2010 | Fong et al. | |
| 2011/0030361 A1 * | 2/2011 | Gopalswamy | F16D 31/02 |
| | | | 60/398 |
| 2011/0041490 A1 * | 2/2011 | Gogoana | F15B 1/024 |
| | | | 60/484 |
| 2011/0120673 A1 | 5/2011 | Xiang et al. | |
| 2011/0259007 A1 | 10/2011 | Aoyama et al. | |
| 2011/0266804 A1 * | 11/2011 | Dolcimascolo | F03B 17/04 |
| | | | 415/916 |
| 2011/0268804 A1 | 11/2011 | Dolcimascolo | |
| 2011/0296822 A1 | 12/2011 | Bollinger et al. | |
| 2012/0305411 A1 | 12/2012 | Elazari-Volcani | |
| 2013/0134612 A1 | 5/2013 | Lewis et al. | |
| 2013/0214537 A1 | 8/2013 | Hashimoto | |
| 2013/0219892 A1 | 8/2013 | Havel | |
| 2013/0220310 A1 | 8/2013 | Gregory et al. | |
| 2014/0026547 A1 | 1/2014 | Kim et al. | |
| 2015/0000248 A1 | 1/2015 | del Omo | |
| 2015/0211551 A1 | 7/2015 | VanWelleghem et al. | |
| 2016/0178129 A1 | 6/2016 | Chen et al. | |
| 2016/0201658 A1 | 7/2016 | Arapkoules | |
| 2016/0348637 A1 | 12/2016 | Bachli | |
| 2017/0264164 A1 * | 9/2017 | Lenk | F03G 7/06 |
| 2018/0306066 A1 * | 10/2018 | Yesil | F01B 17/04 |
| 2018/0320679 A1 | 11/2018 | Enis et al. | |
| 2019/0003384 A1 | 1/2019 | Bannari | |
| 2019/0052094 A1 | 2/2019 | Pmsvvsv et al. | |
| 2019/0064757 A1 * | 2/2019 | Ramamurthy | G05B 13/048 |
| 2019/0221697 A1 | 7/2019 | Cho | |
| 2020/0263830 A1 | 8/2020 | Stradiotto et al. | |
| 2021/0071632 A1 | 3/2021 | Gudesen | |
| 2021/0075296 A1 | 3/2021 | Yogev | |
| 2021/0206574 A1 | 7/2021 | Yogev | |
| 2021/0221652 A1 | 7/2021 | Pedretti et al. | |
| 2021/0351615 A1 | 11/2021 | Yogev | |
| 2021/0388810 A1 | 12/2021 | Young et al. | |
| 2021/0404446 A1 | 12/2021 | Pedretti et al. | |
| 2022/0090585 A1 | 3/2022 | Lewis et al. | |
| 2022/0243701 A1 | 8/2022 | Pedretti et al. | |

FOREIGN PATENT DOCUMENTS

| | | |
|---|---|---|
| CN | 103216426 B | 2/2016 |
| CN | 106091403 A | 11/2016 |
| CN | 105043147 B | 1/2017 |
| CN | 102797613 B | 3/2017 |
| CN | 107002641 A | 8/2017 |
| CN | 104675680 B | 12/2017 |
| CN | 106677848 B | 3/2018 |
| CN | 106499612 B | 6/2018 |
| CN | 109826741 A | 5/2019 |
| CN | 108571415 B | 12/2019 |
| CN | 111636991 A | 9/2020 |
| CN | 112360584 A | 2/2021 |
| CN | 112459980 A | 3/2021 |
| CN | 114198242 A | 3/2022 |
| CN | 114934869 B | 8/2022 |
| JP | 0617555 A | 1/1994 |
| JP | 2015145674 A | 8/2015 |
| TW | M375775 U | 3/2010 |
| TW | 201241308 A | 10/2012 |
| TW | M440345 U | 11/2012 |
| TW | M446825 U | 2/2013 |
| TW | 202108950 A | 3/2021 |
| WO | 2011024928 A1 | 3/2011 |
| WO | 2011076926 A2 | 6/2011 |
| WO | 2015159278 A1 | 10/2015 |
| WO | WO2021078568 A1 | 4/2021 |

OTHER PUBLICATIONS

International Search Report in International Application No. PCT/US23/23060, mailed on Sep. 20, 2023, 17 pages.
International Preliminary Report dated Jun. 13, 2024 in International Application No. PCT/US2022/029374.
TIPO Search Report in Taiwan Application No. 112118947.
TIPO Search Report in Taiwan Application No. 112120898.
TIPO Search Report in Taiwan Application No. 112118938.

(56) References Cited

OTHER PUBLICATIONS

TIPO Search Report in Taiwan Application No. 112128677.

* cited by examiner

GEOTHERMAL ENERGY STORAGE AND CONVERSION SYSTEMS AND METHODS

CROSS-REFERENCE TO RELATED APPLICATIONS

This application is a continuation-in-part (CIP) of the copending U.S. patent application Ser. No. 17/777,516, filed on May 17, 2022, and entitled "ENERGY STORAGE SYSTEMS AND METHODS USING HETEROGENEOUS PRESSURE MEDIA AND INTERACTIVE," which is a National Stage of PCT/US2022/029374, filed on May 16, 2022, and entitled "ENERGY STORAGE SYSTEMS AND METHODS USING HETEROGENEOUS PRESSURE MEDIA AND INTERACTIVE ACTUATION MODULE," which claims a priority to CN202111466565.5, filed on Dec. 3, 2021, and entitled "ENERGY STORAGE SYSTEMS AND METHODS USING HETEROGENEOUS PRESSURE MEDIA AND INTERACTIVE ACTUATION MODULE".

Further, this application claims priority to U.S. Provisional Application No. 63/345,269, filed on May 24, 2022, and entitled "GEOTHERMAL ENERGY STORAGE SYSTEMS AND METHODS."

All of the above are incorporated herein by reference for all purposes.

FIELD OF THE INVENTION

The present invention relates to the technical field of power generation using green energy. Particularly, the present invention relates to a system for and method of energy storage by utilizing underground hot water and pressure.

BACKGROUND

In a conventional pumped-hydro energy storage, energy is stored by transferring water from the bottom of a mountain to a reservoir on the mountain. The difference in height between the water level in the reservoir and the water level downstream creates a potential energy difference. When electricity is needed, the water flows down the mountain, converting the potential energy into the kinetic energy of the falling water. The kinetic energy is used to turn the turbine blades. The rotating turbine then drives a generator, which converts the mechanical energy into electrical energy. This is also the principle of traditional hydroelectric power generation. Such an energy storage system (or power generation system) is limited by topographical conditions and cannot be extensively developed.

Accordingly, there is a need to develop a novel energy storage system.

SUMMARY

In accordance with one aspect of the present disclosure, an energy storage system is provided. The energy storage system comprises an energy storage container forming a first space to store an initial gas; and a force generating device, wherein when in an energy storage mode, the force generating device is configured to provide a force driving a first amount of working fluid entering the energy storage container and further continuously compresses the initial gas in the first space until the initial gas in the first space reaches a predetermined pressure, thereby enabling the energy storage container to store an amount of energy; and wherein when in an electricity generating mode, the force generating device is configured to provide a force driving a second amount of working fluid discharging from the energy storage container for driving a generator to generate electricity.

In accordance with another aspect of the present disclosure, a heterogeneous fluidic media and interactive actuation energy storage system is provided. The heterogeneous fluidic media and interactive actuation energy storage system comprises one or more heterogeneous fluidic media and interactive actuation modules, wherein each of the heterogeneous fluidic media and interactive actuation modules includes: an energy storage container having a first space storing an initial gas; and a working fluid driving device configured to move an amount of a working fluid, when in an energy storage mode, the working liquid is controlled by the working fluid driving device and injected into the energy storage container, so that the working liquid enters the energy storage container, thereby continuously compressing the initial gas in the first space until the initial gas reaches a predetermined pressure, further causing the first container to store a first pressurized energy; and when in an energy generating mode, the working fluid is controlled by the working fluid driving device and is continuously discharged from the energy storage container, causing the working fluid to drive an electricity generator to generate electricity.

In accordance with another aspect of the present disclosure, a geothermal energy storage system is provided. The geothermal energy storage system comprises a water inlet unit; a control unit; an action unit; a first fluid pipe; an energy storage capsule; a generator; a fluid storage tank; and a second fluid pipe, wherein the water inlet unit can receive a hot water generated by geothermal and can convert the hot water into gas; wherein the control unit is connected to the water inlet unit, and the control unit determines a flow direction of the gas; wherein the first fluid pipe is connected to the action unit, the energy storage capsule, and the generator, and the first fluid pipe is filled with a substance; wherein the second fluid pipe is connected to the action unit and the fluid storage tank, and the second fluid pipe is filled with the substance; wherein the action unit is connected to the control unit, and the action unit generates a force through the control unit to change flow directions of the substance located in the first fluid pipe and the substance located in the second fluid pipe, wherein the generator is connected to the energy storage capsule and the first fluid pipe, and the generator is driven by the substance to generate electricity; wherein the energy storage capsule is connected to the first fluid pipe and the energy storage capsule has at least two different kinds of substances and can convert kinetic energy into pressure energy and store the pressure energy by the action of the two different kinds of substances; and wherein the fluid storage tank is connected to the generator and the second fluid pipe, and the fluid storage tank can recover the substance acting on the generator.

In accordance with another aspect of the present disclosure, a planar energy storage system is provided. The planar energy storage system comprises an energy storage section containing a compressible substance; a flow path filled with a working fluid, the flow path being connected to energy storage section; and a drive section generating a pushing force, the drive section being connected to the flow path, wherein the pushing force causes the working fluid to compress the compressible substance, thereby enabling the compressible substance to store energy.

BRIEF DESCRIPTION OF THE DRAWINGS

Embodiments will now be described by way of examples, with reference to the accompanying drawings which are

DETAILED DESCRIPTION OF THE PREFERRED EMBODIMENTS

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Although geothermal energy/heat is disclosed here, the present disclosure also includes using waste heat as a heat source for energy storage. Geothermal heat is one of the various types of waste heat, which is naturally generated in the environment.

Figure 1:
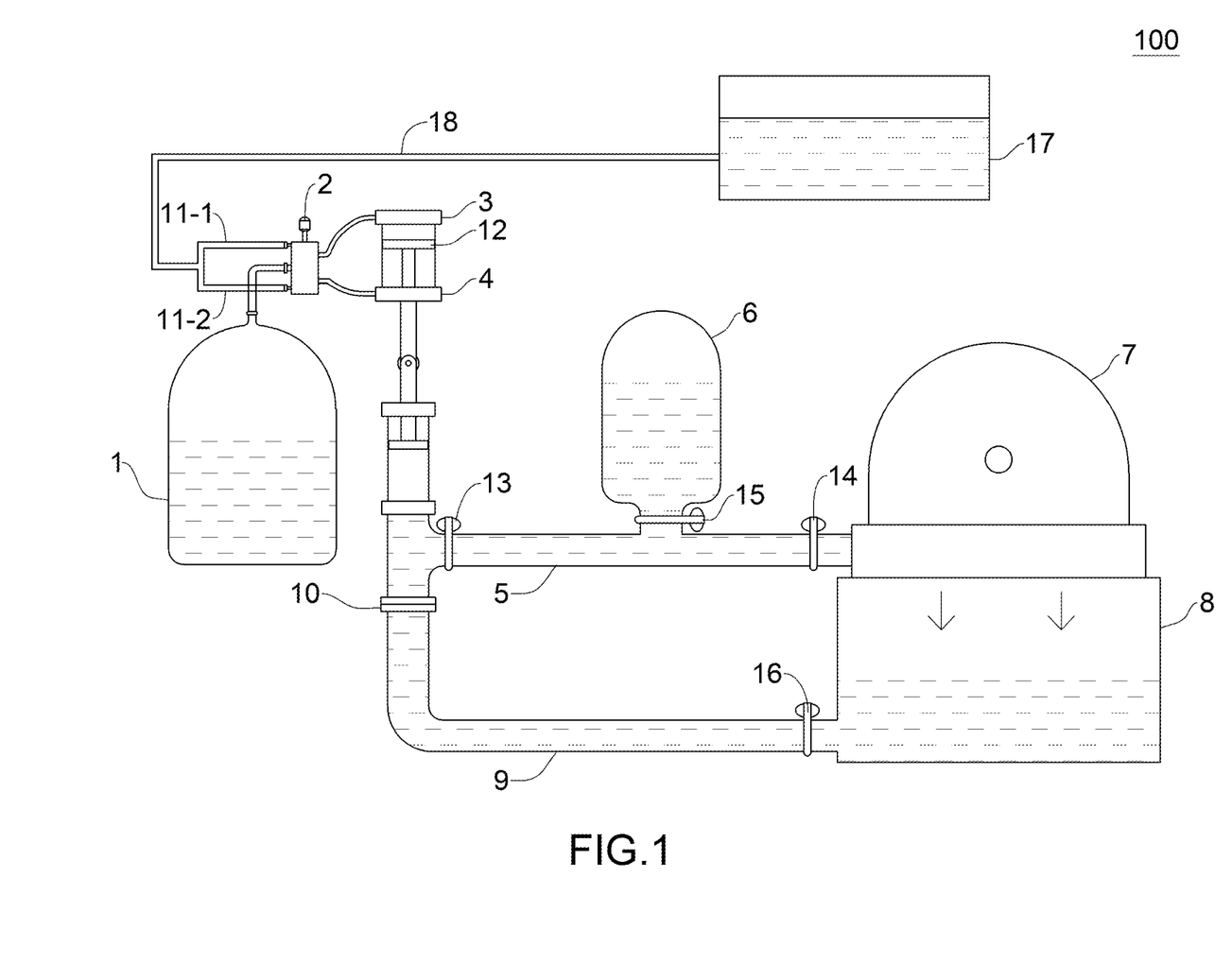
FIG. 1 illustrates a structural diagram of a power generator and/or storage in accordance with some embodiments.

FIG. 1 illustrates a structural diagram of a power generator and/or storage in accordance with some embodiments. The power generator and storage can be driven/powered by geothermal heat and hot groundwater/steam. In FIG. 1, the geothermal feedback energy storage system includes a water inlet unit 1, a controller 2, a piston 12, first inlet hole 3, second inlet hole 4, a first water pipe 5 (used as an example of a first fluid pipe), an energy storage capsule 6, a generator 7, a water storage tank 8 (used as an example of a fluid storage tank), a second water pipe 9 (used as an example of a second fluid pipe), one or more valves 10, 13, 14, 15, and 16, a third inlet hole 11-1, a fourth inlet hole 11-2, and another water storage tank 17 (used as an example of another fluid storage tank).

In this system, the groundwater enters into the water inlet unit 1 from an underground water source. The groundwater is heated by geothermal energy and creates a heated water that has a predetermined range of pressure. Such groundwater can have a temperature range from 120 degrees to 180 degrees (° C.) and a pressure from 4 kg/cm$^2$ to 10 kg/cm$^2$. For example, the temperature can reach 180 degrees (° C.) and the pressure can reach around 10 kg when the groundwater is 1,000 meters below the ground level.

In the water inlet unit 1, the water inlet unit 1 can use a pump to pump an amount of groundwater to enter the water inlet unit 1 through a water pump or other structures/methods. The water inlet unit 1 can be, for example, a storage tank, a container, or a container constructed with a specific material—for example, a space formed by surrounded cement. After the water inlet unit 1 injects groundwater, the groundwater becomes hot water with pressure (e.g., steam), in the water inlet unit 1, for example, there is groundwater of 150 to 180 degrees Celsius (° C). The pressure value is between 6 kg/cm$^2$ to 10 kg/cm$^2$. In the water inlet unit 1, the pressure change is used to convert the liquid into a gas. For example, the condition of the gas may be converted into water vapor with a temperature of 150 degrees Celsius (° C.) and a pressure value of 6 kg/cm$^2$.

In FIG. 1, as an example, when the gas is guided/controlled by controller 2, the gas enters the first inlet hole 3 and the inside space of the piston 12 to drive the piston 12 (e.g., via the gas pressure) to move downward in FIG. 1 to form a thrust and then push (or squeeze) the substance of the first water pipe 5. The substance (e.g., fluids) of the first water pipe 5 (e.g., liquid, solid, gas, or any combination of the previous, etc.) moves towards the energy storage capsule 6. The gas (or steam) formed in the water inlet unit 1 can be guided by controller 2 to guide the gas to the inlet holes 3 and 4 to drive a movement of the piston 12.

In this embodiment, the piston 12 further provides a first inlet hole 3 and a second inlet hole 4. The first inlet hole 3 and the second inlet hole 4 can be used as an injection port or a discharge port. The piston 12 is connected to the first water pipe 5 and the second water pipe 9. Also, in this model above, valve bodies can be provided on both the first water pipe 5 and the second water pipe 9. A valve 10 (e.g., a one-way valve) is provided at one end of the second water pipe 9, so that the valve 10 prevents the liquid from going through the valve 10 when the piston 12 (e.g., a pushing mode) is pressed toward the second inlet hole 4. On the other hand, the liquid is allowed to pass the valve 10 (e.g., moving upward) when the piston 12 is (e.g., a withdrawing mode) pulling toward the first inlet hole 3.

Thus, in a pushing mode (e.g., energy storage), the liquid in the first water pipe 5 is pushed into the energy storage capsule 6; therefore, the volume of the gas of the energy storage capsule 6 is reduced, thereby compressing the gas (e.g., in an operation mode, valves 13 and 15 are open and valve 14 is closed). In this embodiment, the gas may be insoluble or partially dissolved in the liquid during the compression process. If the substance (e.g., liquid or gas) in the first water pipe 5 has no other leaking path except the energy storage capsule 6, the gas in the energy storage capsule 6 is continuously compressed. The flow of the substance located in the first water pipe 5 and the quantity of the substance (e.g., liquid) entering the energy storage capsule 6 can be controlled by the piston 12. And the piston 12 is controlled by controller 2 and the water vapor.

In an energy release/electricity generation mode), the air pressure in the energy storage capsule 6 pushes the substance out from the energy storage capsule 6 so that the substance cause the substance located in the first water pipe 5 move to generator 7, so that electricity can be generated by the substance (liquid or gas) acting on generator 7 (e.g., in an operation mode, the piston remains pushed and the valves 13, 14, and 15 are open). For example, when the substance is a liquid, generator 7 can be a water turbine generator, turbine, hydraulic, or hydro turbine, and electricity is generated by the liquid propelling/driving the water turbine generator to rotate.

In some embodiments, the substance in the first water pipe 5 can be controlled by the valve to control the moving path of the substance. For example, the valve can make the substance in the first water pipe 5 enter the energy storage capsule 6 for compressing the gas, which increases the gas pressure due to the reduction of the space of air (e.g., space displacement).

In some embodiments, when the substance is a gas form, generator 7 can be an air/gas turbine generator, and electricity is generated by the gas propelling/driving the gas turbine generator to rotate and generate electricity.

Next, after operating/closing the valve 13 (opening valves 15 and 14), the substance in the first water pipe 5 moves toward the generator 7, because the substance located in the energy storage capsule 6 pushes the substance located in the first water pipe 5 to form a strong thrust to push the generator 7 until the substance in the energy storage capsule 6 is exhausted (e.g., reduce to a predetermined level of gas pressure or water level) or does not efficiently drive the generator 7 to generate a predetermined rate/amount of electricity. The substance acting on generator 7 is collected in a water storage tank 8.

In some embodiments, the valves and all other controlling components of this system are controlled by a computer or a remote (e.g., wireless) controlling systems, including AI-enabled controlling systems.

Now referring to the pulling mode. The substance stored in the water storage tank 8 will be returned to valve 10 through the second water pipe 9 again during a pulling mode of the piston 12.

After the substance of the energy storage capsule 6 no longer acts on the generator 7 or the material of the energy storage capsule 6 has been consumed, the controller 2 above introduces the gas into the second inlet hole 4 of the piston 12, as shown in FIG. 1 to bring the system back to the initial starting status. For example, after the gas is guided by the controller 2, the gas enters the second inlet hole 4 and the inside space of the piston 12 to drive piston 12 (e.g., via the gas pressure) to move upward in FIG. 1 to form a pulling force, thereby pulling the substances (such as liquid, solid, gas, or any combination of the previous, etc.) from the second water pipe 9 toward the direction of the first water pipe 5 and the energy storage capsule 6, thereby completing the process of energy storage and power generation in the water cycle.

In the above-described process, it can be understood that groundwater provided by geothermal heat already present in the natural environment, operated by the continuously generated water vapor, such as repeatedly pushing/pulling the piston 12, used in water cycle energy storage and power generation systems.

In addition, after the gas (or the water vapor, the steam) acts on the first inlet hole 3 and the second inlet hole 4 of the piston 12, it can pass through a third inlet hole 11-1 and a fourth inlet hole 11-2 of the controller 2 to enter another water storage tank 17 to be cooled. The water temperature of the cooled water vapor is reduced to, for example, about 60 degrees (° C). and is further discharged into the bottom of the ground layer, which can avoid land collapse or concave, it can also continuously generate heated groundwater through geothermal heat.

Figure 2:
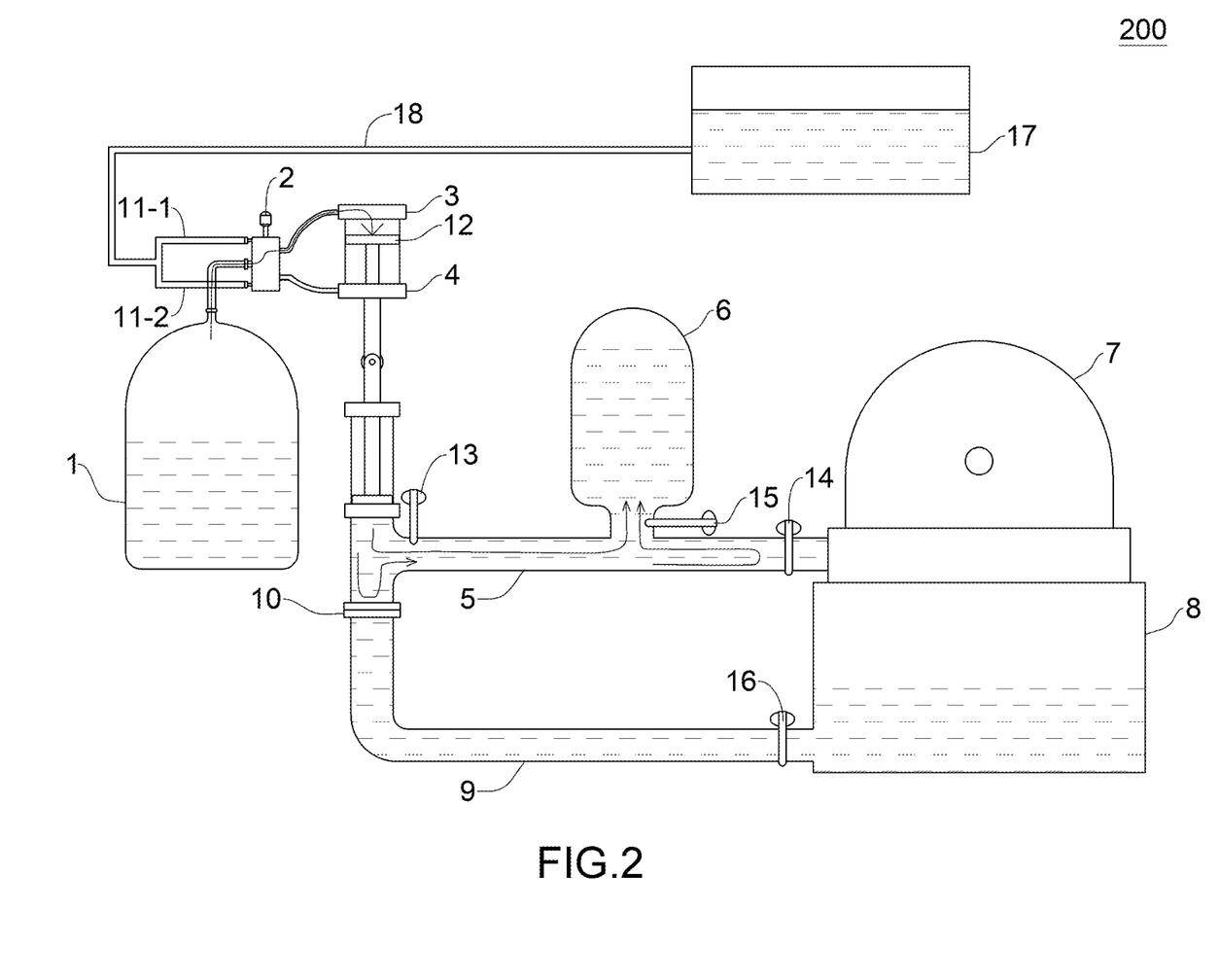
FIG. 2 illustrates an energy storage mode 200 in accordance with some embodiments.

FIG. 2 illustrates an energy storage mode 200 in accordance with some embodiments.

When the gas is guided/controlled by controller 2, the gas enters the first inlet hole 3 to drive the piston 12 to move downward in FIG. 1 to form a thrust and then push (or squeeze) the substance of the first water pipe 5. The substance (e.g., fluids) of the first water pipe 5 (e.g., liquid, solid, gas, or any combination of the previous, etc.) moves towards the energy storage capsule 6. The reduced space in the energy storage capsule 6 causes the pressure of the gas inside the energy storage capsule 6 become higher (e.g., from 1 atm to 50-110 atm). This serves as energy storage. In this embodiment, the energy storage capsule 6 is provided with a valve 15. The valve 15 is located near the connection between the energy storage capsule 6 to determine the entry/exit of the fluid or to determine the storage/release of energy. For example, when the electrical demand is low, the valve 15 is closed so that the compressed gas in the energy storage capsule cannot expand or push the liquid out, thereby storing energy (e.g., pressure energy). During periods of high electrical demand, the valve 15 is opened to allow the compressed gas to expand back to its original lower pressure state (i.e., back to the initial or original pressure), thereby moving liquid to drive the water turbine for generating electricity.

In this embodiment, a piston is used as an action unit. Any type of force can be used to trigger the piston to move up and down. In some embodiments, a machine is used to trigger the piston to push and pull.

In some embodiments, the action unit is coplanar with the energy storage capsule, so that the action unit and energy storage capsule are set on the same horizontal plane. In certain embodiments, the action unit, the fluid pipe, and the energy storage capsule are deposed on the same horizontal plane. As such, the energy storage system (or power generation system) is not constrained by topographical conditions.

Figure 3:
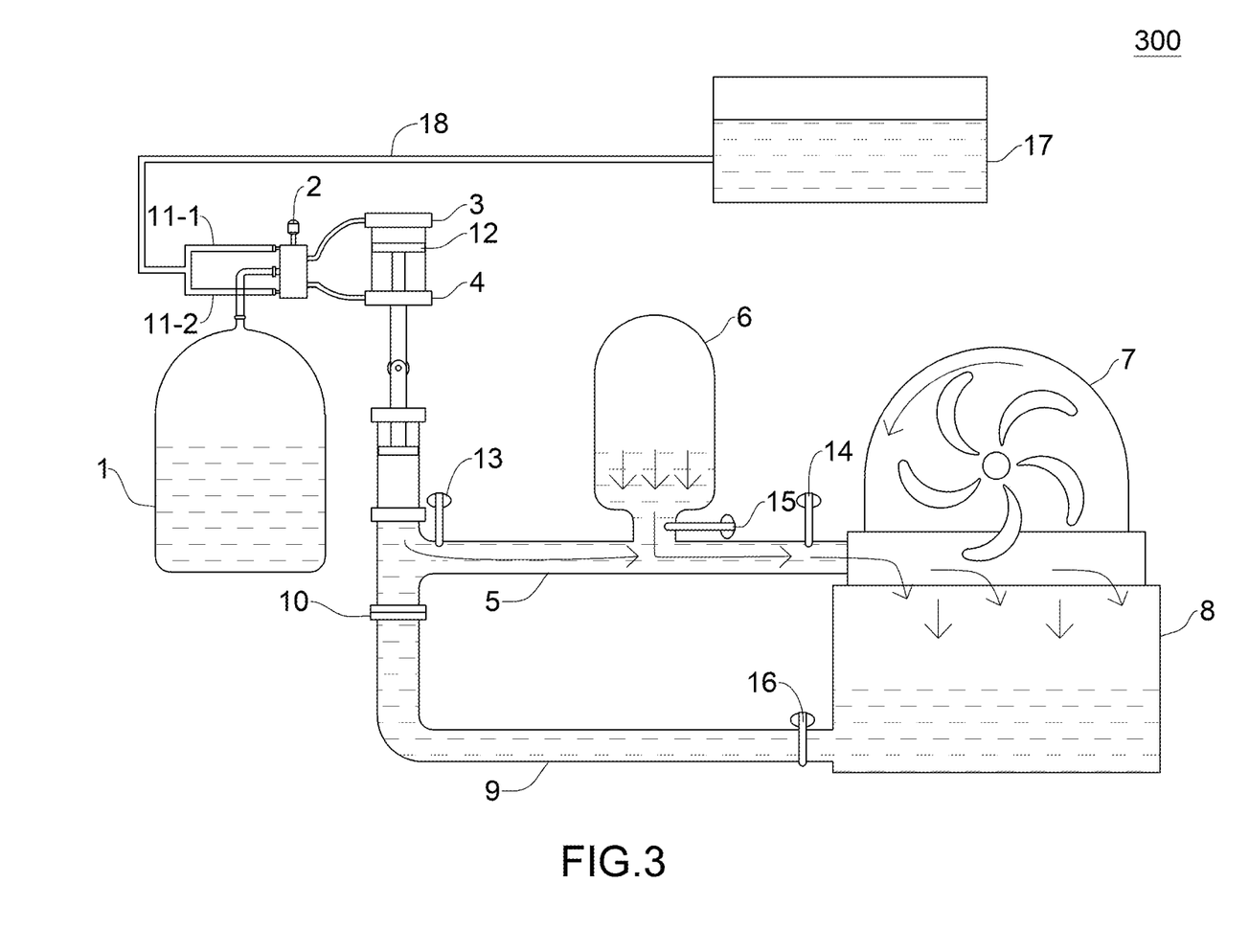
FIG. 3 illustrates an energy release/generation mode 300 in accordance with some embodiments.

FIG. 3 illustrates an energy release/generation mode 300 in accordance with some embodiments.

After operating/closing the valve 13 (while keeping valves 14 and 15 open), the substance in the first water pipe 5 moves toward the generator 7, because the gas pressure in the energy storage capsule 6 pushes the substance located in the first water pipe 5 to form a strong thrust to push the generator 7 until the substance in the energy storage capsule 6 is exhausted (e.g., reduce to a predetermined level) or does not efficiently drive the generator 7 to generate a predetermined rate/amount of electricity. The substance located in the first water pipe 5 may be gas, liquid, solid, slurry or a combination of the previous. In this embodiment, water is used as an example of the substance located in the first water pipe 5. As show in FIG. 3, the generator is connected to a water storage tank 8 as an example of fluid storage tank. The fluid storage tank can recover the substance (e.g., water) acting on the generator. The fluid storage tank can be a natural facility. For example, the natural facilities may be a river, a lake, etc.

Figure 4:
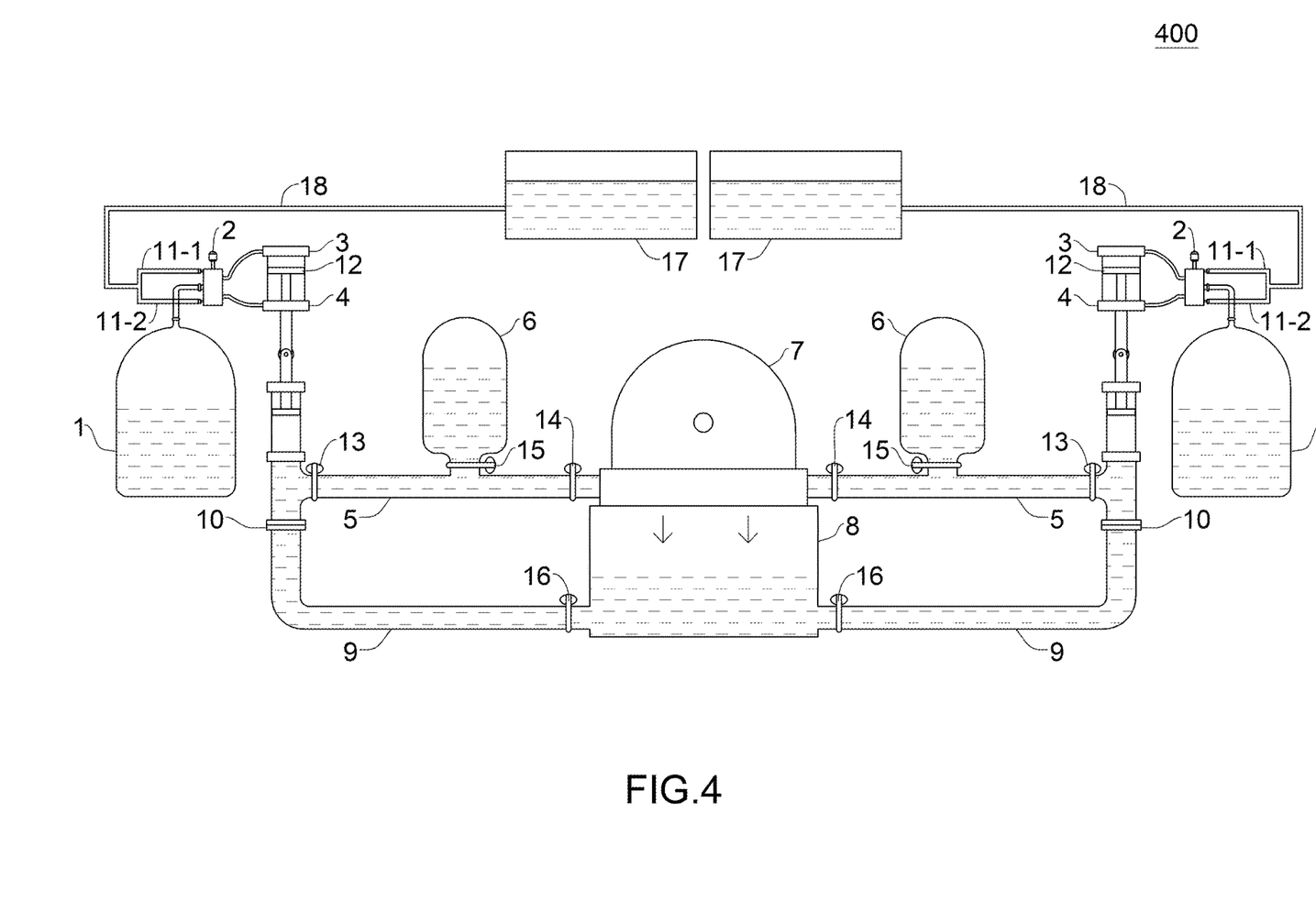
FIG. 4 illustrates an energy release/generation mode 400 in accordance with some embodiments.

FIG. 4 illustrates an energy release/generation mode 400 in accordance with some embodiments.

In FIG. 4, mode 400 shows multiple energy storage units to one hydro turbine generator (multiple-to-one). The energy storage unit can comprise an action unit, a first water pipe 5 (used as a first fluid pipe), an energy storage capsule 6, and a second water pipe 9 (used as an example of a second fluid pipe). The energy storage/power generating system shown in FIG. 4 includes two water inlet units, two storage tanks, and two control units, but it can use only one water inlet unit, one storage tank, and one control unit. For example, in FIG. 4, both action units can be connected to the same control unit so that the other control unit can be omitted. The system may comprise one or more energy storage units. In this embodiment, the system comprises two energy storage units. The number of the energy storage units and the associated hydro turbine generators can be adjusted according to the user's needs.

In FIG. 4, piston 12 can be replaced with a heavy object (e.g. a stone with a certain weight). The weight of the heavy object can be from 40 kg to 60 kg. The weight of heavy object can be adjusted as needed, such as from 1 kg to 100 tons. When a heavy object is used as an action unit, the heavy object is dropped from a higher position to create a thrust. In some embodiments, the dropping of the heavy object can be triggered by a machine. With the thrust, the energy storage/generation process in FIG. 1 can be implemented as described above. The heavy object can be pushed back to its original position (higher position) by a mechanical force and the process of energy storage and power generation can be repeated.

Figure 5:
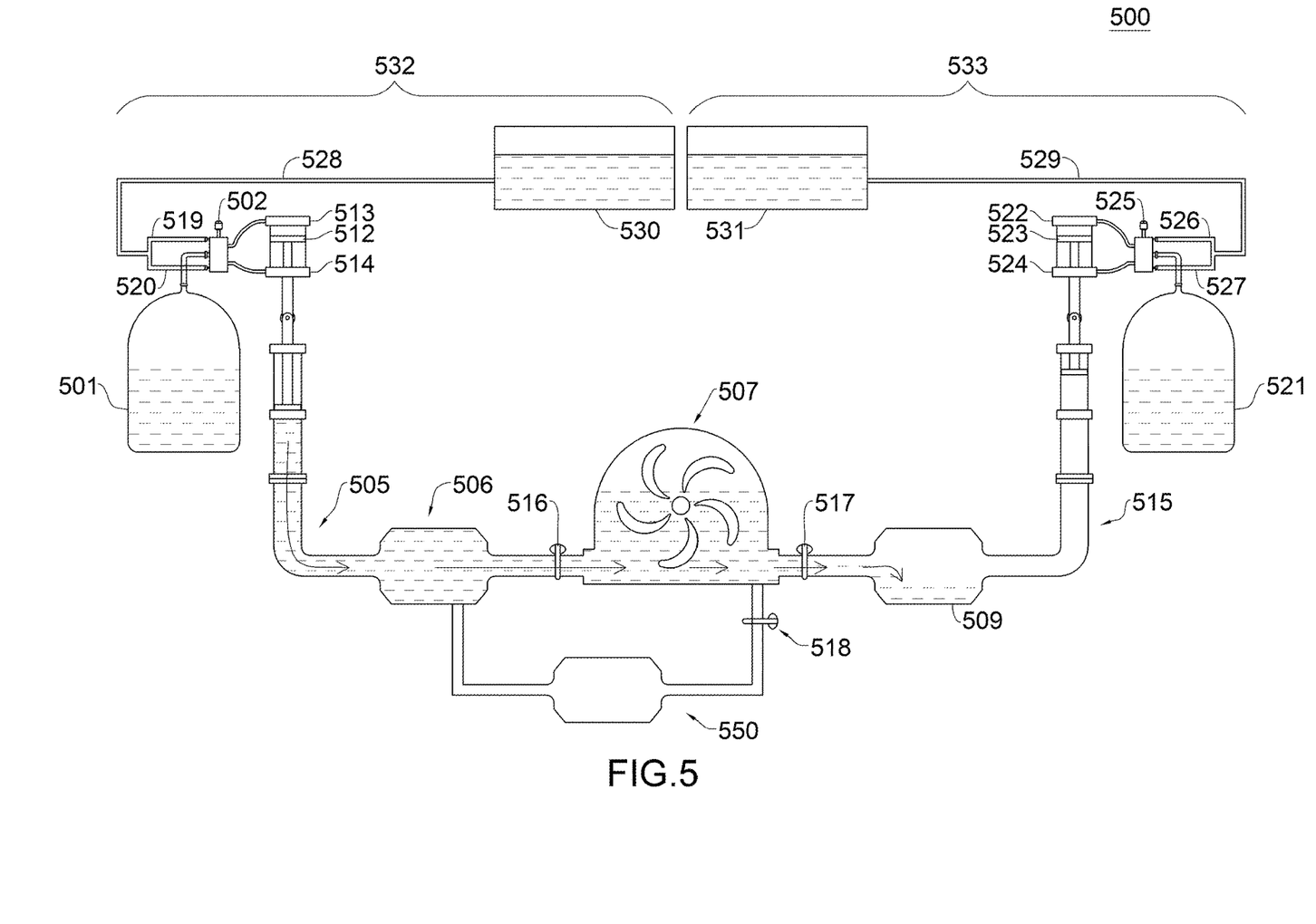
FIG. 5 illustrates a geothermal energy converter 500 in accordance with some embodiments.

FIG. 5 illustrates a geothermal energy converter 500 in accordance with some embodiments.

The geothermal energy converter 500 disclosed below can be combined with the energy storage described above in FIG. 1-4, so that a system can perform both geothermal energy conversion and storage. The geothermal energy converter 500 can be driven/powered by geothermal heat and hot groundwater/steam.

In the FIG. 5, the geothermal energy converter 500 includes a first water inlet unit 501, a second water inlet unit 521, a first controller 502, a second controller 525, a first piston 512, a second piston 523, a first set of first inlet hole 513, a second set of first inlet hole 522, a first set of second inlet hole 514, a second set of second inlet hole 524, a first water pipe 505, a second water pipe 515, a first liquid storage vessel 506, a generator 507 (e.g., hydrogenerator), a second liquid storage vessel 509, one or more valves 516, 517 and 518, and water storage tanks 530 and 531.

The geothermal energy converter 500 can include a first operational unit 532 and a second operational unit 533. The first operational unit 532 and the second operational unit 533 can jointly work as a non-stop electricity generation system.

In operation, the groundwater enters the water inlet unit 501 from an underground water source. The groundwater is heated by geothermal energy and creates heated water that has a predetermined range of pressure. Such groundwater can have a temperature range from 120 degrees to 180 degrees (° C). and a pressure from 4 kg/cm$^2$ to 10 kg/cm$^2$. For example, the temperature can reach 180 degrees (° C). and the pressure can reach around 10 kg when the groundwater is 1,000 meters below the ground level.

In water inlet unit 501, the water inlet unit 501 can use a pump to pump an amount of groundwater to enter the water inlet unit 501 through a water pump or other structures/methods. The water inlet unit 501 can be, for example, a storage tank, a container, or a container constructed with a specific material—for example, a space formed by surrounded cement. After the water inlet unit 501 injects groundwater, the groundwater becomes hot water with pressure (e.g., steam), in the water inlet unit 1, for example, there is groundwater of 150 to180 degrees Celsius (° C). The pressure value is between 6 kg/cm$^2$ to 10 kg/cm$^2$. In the water inlet unit 501, the pressure change is used to convert the liquid into a gas. For example, the condition of the gas may be converted into water vapor with a temperature of 150 degrees Celsius (° C.) and a pressure value of 6 kg/cm2.

In FIG. 5, as an example, when the gas is guided/controlled by controller 502, the gas enters the first inlet hole 513 and the inside space of the piston 512 to drive the piston 512 (e.g., via the gas pressure) to move downward in FIG. 5 to form a thrust and then push (or squeeze) the liquid (e.g., water) of the first water pipe 505. The substance (e.g., fluids) of the first water pipe 505 (e.g., liquid, solid, gas, or any combination of the previous, etc.) moves towards the first liquid storage vessel 506. The gas (or steam) formed in the water inlet unit 501 can be guided by controller 502 to guide the gas to the inlet holes 513 and 514 to drive a movement of the piston 512.

In this embodiment, the piston 512 further provides a first inlet hole 513 and a second inlet hole 514. The first inlet hole 513 and the second inlet hole 514 can be used as an injection port or a discharge port. The piston 512 is connected to the first water pipe 505.

Valves 516, 517, and 518 can control the flow of the fluid stream.

Thus, in a first unit 532 electricity generation mode, the liquid in the first water pipe 505 is pushed, via the space reduced that is occupied by the piston 512, toward the first liquid storage vessel 506. Since the first liquid storage vessel 506 is full of liquid, the extra incoming liquid is pushed toward the hydrogenerator 507 generating electricity. The liquid that passed through the hydrogenerator 507 is stored at the second liquid storage vessel 509. When the extra liquid (the volume of liquid moved by the space reduction of the piston) from the first operational unit 532 is consumed or depleted, the second operational unit 533 starts to move the second piston 523 to a pushed mode, which is like the operational manner of the first operation unit 532 described earlier. Thus, the first operational unit 532 and the second operational unit 533 take turns forming a non-stop and continuous geotherm energy converter, which converts the geothermal energy or any other type of thermal/pressure into electricity.

In a receiving mode, the piston 512 is move upward by having the steam going through a first set of second inlet hole 514, so that the first piston is moving upward (e.g., a withdraw mode), so that the fluid is moving back toward the first operational unit 532. The receiving mode in the second operational unit 533 works similar to the receiving mode of the first operational unit 532.

In some embodiments, the first operational unit 532 can be constructed in a stand-alone unit (e.g., without the second operational unit 533) by having a returning unit 550 controlled by valve 518. In such construction, valve 517 (e.g., closed) can be the stop point/separation point to have the above stand-alone unit.

After the gas (or the water vapor, the steam) acts on the first set of the first inlet hole 513 and the first set of the second inlet hole 514 of the first piston 512 of the first operational unit 532, it can pass through a first set of the third inlet hole 519 and a first set of the fourth inlet hole 520 of the first controller 512 to enter another water storage tank 530 to be cooled. Similarly, the gas (or the water vapor, the steam) acts on the second set of the first inlet hole 522 and the second set of the second inlet hole 524 of the second piston 523 of the second operational unit 533, it can pass through a second set of the third inlet hole 526 and a second set of the fourth inlet hole 527 of the second controller 525 to enter another water storage tank 531 to be cooled. The water temperature of the cooled water vapor is reduced to, for example, about 60 degrees (° C.) and is further discharged into the bottom of the ground layer, which can avoid land collapse or concave, it can also continuously generate heated groundwater through geothermal heat.

Figure 6:
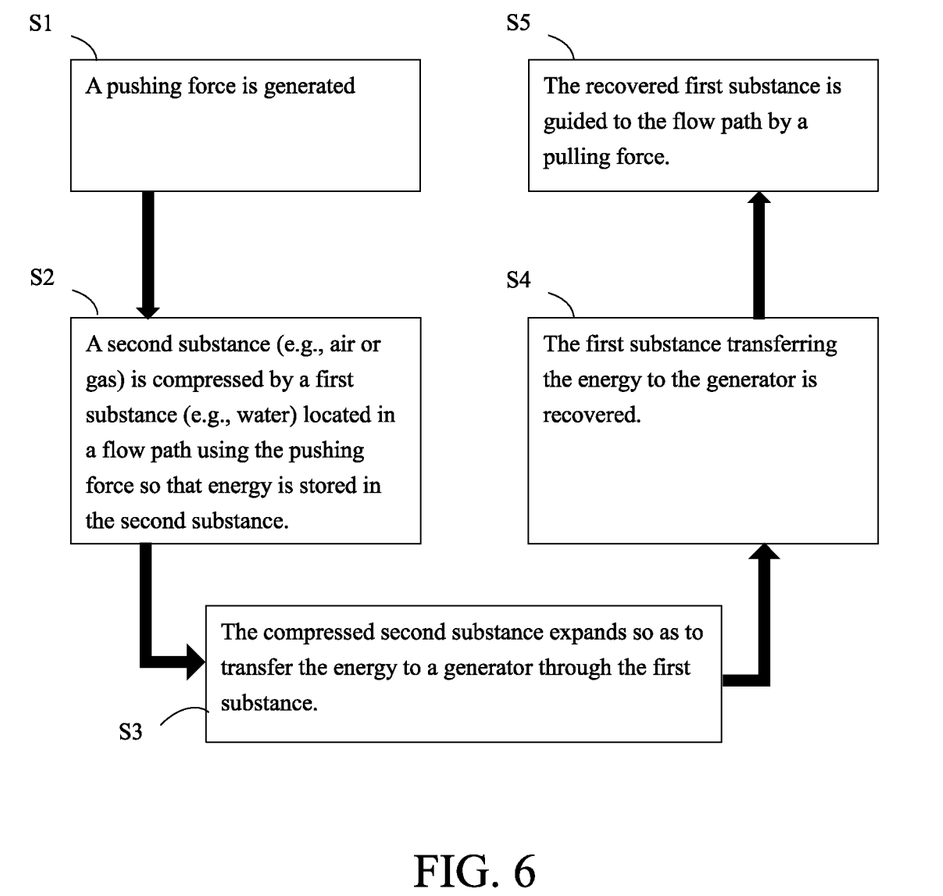
FIG. 6 is a flow chart illustrating a process of energy storage and generation in a cycle in accordance with some embodiments.

FIG. 6 is a flow chart illustrating a process of energy storage and generation cycle in accordance with some embodiments.

In step S1, a pushing force is generated. The force can be controlled by an action unit, such as a piston, and generated by steam through geothermal heat or a heavy object, etc.

In step S2, a second substance (e.g., air or gas) is compressed by a first substance (e.g., water) located in a flow path using the pushing force so that energy is stored in the second substance. Each of the first and second substances may be a gas, a liquid, a solid, or a combination thereof. In some embodiments, the first substance is a fluid. The fluid can be water. In some embodiments, the second substance is a compressible substance (e.g., gas). The gas may be an inert gas (e.g., He), nitrogen, or a mixture of different types of gases). In FIG. 1, the force causes the substance (first substance) located in the first water pipe 5 to compress the substance (second substance) located in the energy storage capsule 6. The compressed substance will store energy (pressure energy) due to the reduced volume and increased pressure. Thus, steps S1 and S2 can be considered as an energy storage process. The energy storage capsule 6 can be made of a pressure-resistant material because the compressed substance has a higher pressure (e.g., from or between 40-60 atm, or from 1-200 atm).

In step S3, the compressed second substance expands to push the first substance out from the energy storage capsule 6, which in turn causes the first substance to flow to a generator to generate electricity. The generator can be a water turbine generator, a turbine, a hydraulic turbine, or a hydro turbine. Thus, step S3 can be considered an energy generation/release process. During the transfer of the energy, the energy may be lost in the form of waste heat. Therefore, the energy release/generation system can further comprise a heat recovery unit. The heat recovery unit can be connected to the first fluid pipe and the water inlet unit so that the groundwater in the water inlet unit can be heated by the waste heat.

In step S4, the first substance transferring the energy to the generator is recovered. Specifically, when the first substance has finished transferring energy, it will be collected in, for example, a water storage tank.

In step S5, the recovered first substance is guided to the flow path by a pulling force. The guided first substance is used for the next round of energy storage/generation, thereby completing the process of energy storage and power generation in a fluid (e.g., water) cycle. The pulling force can be generated by the action unit used to generate the pushing force in step S1. The Step S1 to S5 can be repeated forming a complete energy storage and re-generation circle.

We claim:

1. A geothermal feedback energy storage system comprising:
   a water tank;
   a controller device;
   piston;
   a first fluid pipe;
   an energy storage capsule;
   a generator;
   a fluid storage tank; and
   a second fluid pipe,
   wherein the water tank receives a hot water generated by geothermal heat and converts the hot water into gas;
   wherein the controller device is connected to the water tank, and the controller device determines a flow direction of the gas, wherein the flow direction of the gas positions a status of the piston;
   wherein the first fluid pipe is connected to the piston, the energy storage capsule, and the generator, and the first fluid pipe is filled with a fluidic substance;
   wherein the first fluid pipe is coupled with the energy storage capsule such that the fluidic substance moving through the first fluid pipe is able to flow directly to the generator;
   wherein the second fluid pipe is connected to the piston and the fluid storage tank, and the second fluid pipe is filled with the fluidic substance;
   wherein the piston is connected to the controller device, and the piston generates a force through the controller device to force the fluidic substance located in the first fluid pipe to the energy storage capsule or the generator,
   wherein the generator is connected to the energy storage capsule and the first fluid pipe, and the generator is driven by the fluidic substance to generate electricity;
   wherein the energy storage capsule is connected to the first fluid pipe and the energy storage capsule has the fluidic substance and pre-pressurized gas having a pressure no less than 20 atm and wherein the energy storage capsule stores pressure by using the fluidic substance to compress the gas; and
   wherein the fluid storage tank is connected to the generator and the second fluid pipe, and the fluid storage tank to receive the fluidic substance acting on the generator.

2. The geothermal feedback energy storage system according to claim 1, wherein the piston contains a piston and a plurality of inlet holes, and the piston generates the action force.

3. The geothermal feedback energy storage system according to claim 1, wherein the energy storage capsule contains one or more containers.

4. The geothermal feedback energy storage system according to claim 1, further comprising another fluid storage tank to collect water vapor and convert the water vapor into a liquid for discharging into the bottom of a formation.

* * * * *